United States Patent [19]

Canning et al.

[11] 4,241,125
[45] Dec. 23, 1980

[54] FOAM PLASTICS SHEET MATERIALS

[75] Inventors: Rodger G. Canning, Chorley; John P. Tomlinson, Darwen, both of England

[73] Assignee: Reed International Limited, England

[21] Appl. No.: 56,341

[22] Filed: Jul. 10, 1979

[51] Int. Cl.[3] .......................... B32B 3/00; B32B 3/26
[52] U.S. Cl. .................................. 428/158; 156/79; 156/277; 427/258; 427/373; 427/265; 428/159; 428/172; 428/315
[58] Field of Search ............... 428/158, 159, 160, 172, 428/310, 315; 156/79, 277; 427/257, 258, 265, 373

[56] References Cited

U.S. PATENT DOCUMENTS

| 3,278,466 | 10/1966 | Cram | |
| 3,362,862 | 1/1968 | King | 428/310 |
| 3,607,593 | 9/1971 | Semenzato | 428/314 |
| 3,649,325 | 3/1972 | Affeldt | 428/310 |
| 3,914,485 | 10/1975 | Curtis | 428/160 |
| 3,931,429 | 1/1976 | Austin | 428/315 |
| 4,068,030 | 1/1978 | Witman | 428/159 |

FOREIGN PATENT DOCUMENTS

| 2121370 | 8/1972 | France | 428/159 |
| 1409295 | 10/1975 | United Kingdom | 156/79 |
| 1457001 | 12/1976 | United Kingdom | |
| 1554166 | 10/1979 | United Kingdom | |

OTHER PUBLICATIONS

Chem. Abst., vol. 83, No. 14, Oct. 6, 1975, Abstract Number 116404c, p. 111.

*Primary Examiner*—William J. Van Balen
*Attorney, Agent, or Firm*—Larson, Taylor and Hinds

[57] ABSTRACT

Foam plastics sheet material, such as a wallcovering, has a pronounced decorative relief finish and comprises a substrate web with a foam coating some at least of which is blistered. The blistering is achieved by having two foamable coatings on the web, the lower of which is sacrificed to produce the blistering in the upper. In one method the lower coating is foamed, the upper coating is then applied in its pre-foamed state, and then heated so that the lower coating is sacrificed and the upper coating is foamed and blistered. In another method both coatings are applied in their unfoamed state with the lower coating having a lower foaming temperature than that of the upper coating. Both coatings are then heated together. The lower coating foams and is then sacrificed. The upper coating foams and blisters.

8 Claims, 7 Drawing Figures

FOAM PLASTICS SHEET MATERIALS

BACKGROUND OF THE INVENTION

This invention relates to foam plastics sheet materials having a decorative relief finish, such as wallcovering materials.

In order to give a decorative relief finish to foamed plastics sheet materials it is known to use mechanical embossing or selective foaming using foam inhibitors or kickers (sometimes known as "chemical embossing").

The former tends to require expensive and massive machinery. The latter tends to create a glossy, rounded appearance with a depth of relief which is only a small fraction of the foam thickness.

SUMMARY OF THE INVENTION

It is an object of the present invention to provide a foam plastics sheet material, such as wallcovering, having a pronounced decorative relief finish of good durability, having a soft pleasant touch and suitable for presentation in diverse forms, patterns and colours.

The material according to the present invention comprises a substrate web with a foam coating, some at least of which is blistered so that irregular macroscopic voids exist below the coating and a wholly or partially sacrificed foam coating exists between the surface coating and the substrate web.

(The term "coating" is intended to cover an overall or partial coating).

The process according to the present invention comprises applying a first foamable coating to a substrate web and then applying a second foamable coating to the first covering and foaming the second coating whilst sacrificing the first coating whereby irregular macroscopic voids are created below the surface of the second coating.

The said process may be carried out in two main ways.

In the first way: the first coating, which may be of the same composition as that of the second coating, is foamed prior to applying the second coating so that, in the act of foaming the second coating, the first coating is taken beyond the fully foamed condition and is sacrificed to create said macroscopic voids.

In the second way: the first coating is selected to have a lower foaming temperature than that of the second coating and the two coatings are foamed at the same time with the first coating sacrificing at least some of its gas content to create said macroscopic voids.

DETAILED DESCRIPTION OF THE INVENTION

The invention will now be described further with reference to the accompanying drawings in which FIGS. 1A, 1B, 1C and 1D show sections taken in the steps of manufacturing a material corresponding to the "first way" mentioned above.

Figure 2A:
Figure 2B:
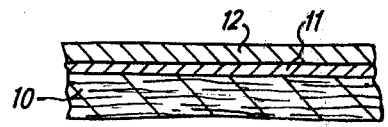
Figure 2C:
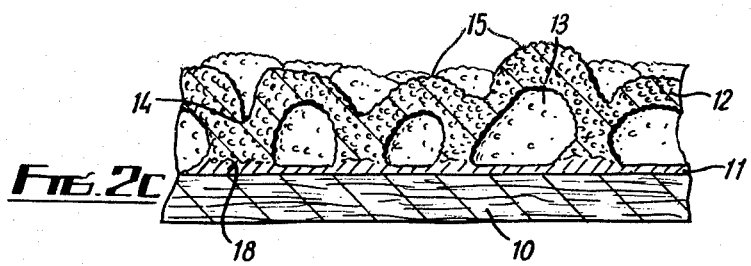

FIGS. 2A, 2B and 2C show sections taken in the steps of manufacturing a material corresponding to the "second way" mentioned above.

Figure 1A:
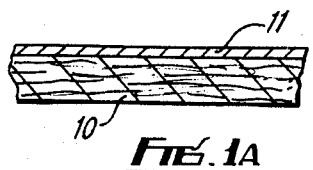
Figure 1B:
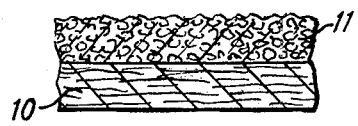
Figure 1C:
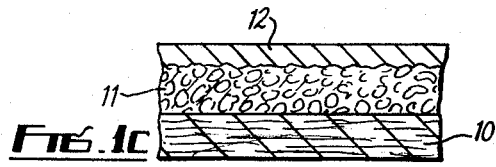
Figure 1D:
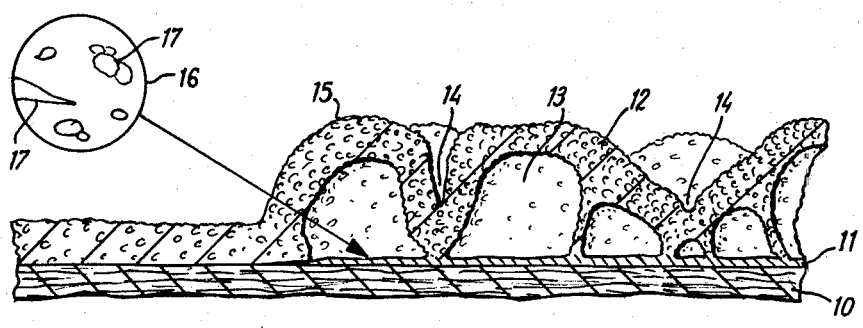

In FIG. 1A there is shown a paper substrate web 10 with a first or sacrificial coating 11 of first foamable composition. In FIG. 1B the coating 11 has been fully foamed. In FIG. 1C a second foamable composition coating 12 is shown on the coating 11. In FIG. 1D the coating 12 has been heated to cause foaming and at the same time the coating 11 has been taken beyond the fully foamed condition so that the foam structure has been sacrificed. This causes macroscopic voids 13 to appear below the coating 12. The voids 13 create a blister effect 15 with deep valleys 14 on coating 12. Many of the blisters have steep walls approaching the vertical. This not only gives a very sharp outline to any pattern adopted but also a rich embossed effect over the whole of the blistered area. The area enclosed by the circle 16 shows the collapsed surface structure of the coating 11. There are a number of very low relief craters 17 of various shapes.

FIG. 2A can be likened to FIG. 1A. In FIG. 2B the coating 11 has been heated to cause it to gell and dry and a coating 12 has been applied. In FIG. 2C both coatings have been heated to cause foaming and sacrifice of the coating 11. This arises because the coating 11 has a lower foaming temperature than the coating 12. There are residual traces 18 of the coating 11, which may be still in the foamed condition, at the base of the valleys 14 of the coating 12.

In the process steps described above one or both coatings may be applied only to selected parts such as by printing. The coating 12 however should be applied over at least some of the parts of the covering 11.

The substrate web may, for example, be paper, board, wood, plastics film or sheet, and woven or non-woven textiles made of natural or synthetic fibrous materials.

The substrate web may, if desired, be given a ground coating, over some or all of its surface, of material containing a polymeric binder prior to application of the covering 11.

The ground coat may form the sacrificial coat 11 by incorporation of a heat decomposable blowing agent.

Where the substrate web is porous, the sacrificial coat may take the form of an impregnation of the substrate web with a solution or dispersion of the blowing agent.

However it is preferred that the sacrificial coating is a composition containing a blowing agent and a polymeric binder. Examples of binders include the thermoplastic polymeric materials listed hereinafter in relation to the surface coating, thermosetting polymers such as polyurethanes, phenol formaldehyde, urea formaldehyde, or melamine formaldehyde resins, synthetic rubbers, natural polymeric materials such as rubber, starch, gums and rosins. The sacrificial coating may be applied in liquid form or in powder form on an adhesive layer. When applied in liquid form, and, where it contains a polymeric binder, the coating may be dried or fused. The sacrificial coating may be an ink or lacquer containing a heat decomposable blowing agent, or it may comprise a plastisol. The surface coating composition may be applied while the sacrificial coating is wet.

Materials that may be used in the coatings include polymers or copolymers of at least one ethylenically unsaturated monomeric material selected from olefins; vinyl chloride; vinyl esters; vinyl ethers; acrylonitrile; esters of acrylic or methacrylic acids; styrene; butadiene; and isobutylene and thermoplastic cellulosic polymers. Mixtures of polymers may be employed.

Additives that modify the decomposition temperature of the blowing agent used include activators, or inhibitors.

Preferably the sacrificial coating composition contains a blowing agent that decomposes at a temperature at least 10° C. below the decomposition temperature of the blowing agent system of the surface coating composition. The sacrificial composition may contain two blowing agents, one decomposing at a lower temperature and one at a higher temperature. The latter may be the same as the blowing agent in the surface coating.

The amount of the sacrificial coating applied is preferably such that the weight of low temperature blowing agent is from 0.5 to 10 g/m². If smaller amounts of low temperature blowing agents are employed, a poor overall texture is obtained, while if higher amounts are employed the blister relief is unduly large and weak. It is preferred that, where the amount of low temperature blowing agent applied is small, for example below 2 g/m² the sacrificial coating should also contain some high temperature blowing agent, preferably in such a quantity that it is applied at a rate 0.5 to 5 times the rate of the low temperature blowing agent.

The surface coating is preferably applied at a rate of 60 to 1200 g of binder material in that covering per square meter of substrate. By the term binder material we mean the non-volatile components of the surface coating composition, that, on heating, coalesce to form an integrated film. In computing the quantity of binder material, any inorganic non film-forming ingredients such as fillers and pigments are excluded. If the surface coating composition is applied too thickly, then, on foaming, the blistering effect may not be good. For this reason where the amount of low temperature blowing agent applied is below about 5 g/m², the ratio of the amount of low temperature blowing agent plus high temperature blowing agent, if any, applied from the sacrificial coating to the amount of binder material applied from the surface coating should exceed 0.01.

The surface coating composition preferably contains 0.5 to 15% particularly 1 to 10%, by weight of blowing agent, based on the weight of the binder material in the composition.

Where the polymeric material of the surface coating is a vinyl chloride homo or co-polymer, it is conveniently applied as a plastisol in which case the non-volatile plasticiser is included in computing the weight of binder material. Where the surface coating composition is applied as an overall layer, it may be applied in the molten state by extrusion of calendering or laminating.

Products according to the invention could be given an additional embossing treatment such as by mechanical embossing, chemical embossing, or even by embossing the substrate so that coverings applied, in or out of register with the embossing, have a varying thickness before foaming.

A printed pattern and a wear layer may be applied.

The invention is illustrated further by the following examples in which all parts and percentages are by weight.

EXAMPLE 1

A PVC plastisol (A) containing a higher temperature blowing agent was made up to the following formulation:

| | Parts | |
|---|---|---|
| Paste grade vinyl chloride homopolymer | 100 | |
| Dicaprylphthalate (plasticiser) | 55.5 | |
| Epoxidised oil (stabiliser) | 3 | binder material |
| Viscosity depressant | 3 | |
| Titanium dioxide | 21 | |
| Cadmium/zinc octoate (activator) | 4 | |
| Azodicarbonamide (blowing agent—decomposes 195–210° C.) | 5.5 | |

(The decomposition temperatures quoted, in this and the other examples, for the blowing agents, are the decomposition temperatures in the absence of any activator or inhibitor).

A further PVC plastisol (B) was made up, similar to plastisol (A), but containing, in addition to the azodicarbonamide, 2 parts of a low temperature blowing agent, p,p'oxybis(benzenesulphonylhydrazide) which decomposes at 157° C.

Plastisol (B) was coated as a film of wet thickness 0.08 mm as a sacrificial coating on to a wallpaper base paper of a substance 90 g/m². The amount of low temperature blowing agent applied was thus 0.9 g/m², while the amount of high temperature blowing agent applied was 2.5 g/m².

The coated paper was heated in an oven maintained at 200° C. for 10 seconds to cause the plastisol to gell. However the time the coated paper was in the oven was insufficient for the coating to reach the decomposition temperature of the low temperature blowing agent, and so the coating did not foam (FIG. 2A). The paper bearing the sacrificial coating was then coated with the surface coating by applying a layer (wet thickness 0.4 mm) of plastisol (A) (FIG. 2B). The amount of binder material applied from the surface coating was thus 291 g/m². The coated paper was then heated in an oven at 200° C. for 60 seconds to effect gellation of the surface coating and foaming of both coatings with eventual loss of foam from the sacrificial coating.

The resultant product (FIG. 2C) had a blistered relief, the blisters being about 0.5 to 2 mm diameter in size. (This is to be compared with the normal cells in the body of the foamed coating which were 0.1–0.2 mm in size).

To the naked eye there were no signs remaining of the plastisol (B), the sacrificial coating.

EXAMPLE 2

Similar results were obtained when 2 parts of diphenylsulphone-3,3'-disulphonylhydrazide (decomposition temperature 155° C.) were used in plastisol (B) in place of the p,p'oxybis(benzenesulphonylhydrazide).

EXAMPLES 3–13

Example 1 was repeated using a series of plastisols similar to plastisol (B) but omitting the azodicarbonamide and containing differing amounts of low temperature blowing agent. The surface coating was applied at differing rates. In Examples 8 to 12, 2.5 parts of azodicarbonamide were added to the sacrificial coating. The proportions and results are shown in the table.

| | Sacrificial Coat. Application rate of blowing agent g/m² | | Surface Coat. Application rate of binder | | |
|---|---|---|---|---|---|
| Example | LT | HT | material g/m² | R | Texture |
| 3 | 2.6 | 0 | 76 | .034 | Blisters. |
| 4 | 2.6 | 0 | 294 | .009 | Masked. |
| 5 | 1.8 | 0 | 76 | .023 | Little. |
| 6 | 1.8 | 0 | 186 | .01 | Very little. |
| 7 | 1.8 | 0 | 252 | .007 | Masked. |

-continued

| Example | Sacrificial Coat. Application rate of blowing agent g/m² | | Surface Coat. Application rate of binder material g/m² | R | Texture |
| --- | --- | --- | --- | --- | --- |
| | LT | HT | | | |
| 8 | 1.7 | 2.5 | 76 | .055 | Blisters. |
| 9 | 1.7 | 2.5 | 168 | .025 | Blisters. |
| 10 | 1.7 | 2.5 | 270 | .016 | Blisters. |
| 11 | 0.9 | 0 | 354 | .003 | None. |
| 12 | 0.8 | 2.5 | 354 | .009 | None. |
| 13 | 5.1 | 0 | 270 | .02 | Large blisters. |

These examples show that with the use of small amounts of low temperature blowing agent (Examples 5–7), the relief can be coarsened by the addition of a high temperature blowing agent (Examples 8–10). Also if the ratio R is below 0.01 (Examples 4, 7, 11, 12) no texture is obtained.

EXAMPLE 14

By way of comparison Example 3 was repeated but using the high temperature blowing agent containing plastisol for the sacrificial coating and the low temperature blowing agent containing plastisol as the surface coating. No macroscopic voids were obtained.

EXAMPLE 15

In this example a low temperature blowing agent was incorporated into a paper ground coating formulation. The coating formulation (formulation C) had the following composition:

| | Parts |
| --- | --- |
| Acrylic polymer emulsion (50% solids) | 100 |
| Clay | 300 |
| Dispersing agent | 0.9 |
| Aqueous ammonia (92% NH₃) | 1.8 |
| p,p'oxybis(benzenesulphonylhydrazide) | 67 |
| Water | 270 |

The ground coating composition was applied as a film of wet thickness 0.08 mm on to a wallpaper base paper of substance 90 g/m², and allowed to dry. The amount of blowing agent applied was thus 8.2 g/m². A surface coating composition was then applied using plastisol (A) to form a layer of wet thickness 0.4 mm, to give a binder material of application rate 291 g/m².

The coating was gelled and foamed by heating for 60 seconds in an oven at 200° C.

The procedure was repeated applying coatings of plastisol (A) of other thicknesses so that the binder material in the plastisol was applied at rates varying from 226 to 904 g/m².

The products again had an attractive "blister" type relief texture on the surface of the foamed plastisol. The coarseness of the relief texture increased as the thickness of the main coating of the plastisol composition was increased.

EXAMPLE 16

Example 15 was repeated but applying the ground coat in a printed pattern, leaving some areas uncoated. The plastisol (A) was applied as an overall coating.

The product had an attractive relief pattern of blisters on the surface of the foam corresponding to the printed pattern of the ground coat. Again the coarseness of the relief increased as the plastisol coating thickness increased.

Similar results were obtained when Examples 15 and 16 were repeated using a ground coat formulation (formulation D) of composition:

| | Parts |
| --- | --- |
| Acrylic polymer emulsion (50% solids) | 100 |
| Clay | 150 |
| Titanium dioxide | 100 |
| Dispersing agent | 0.6 |
| Aqueous ammonia (92% NH₃) | 1.9 |
| p,p'oxybis(benzenesulphonylhydrazide) | 53 |
| Water | 180 |

Likewise similar results were obtained using ground coats in which the p,p'oxybis(benzenesulphonylhydrazide) was replaced by an equal amount of 5-morpholyl-1,2,3,4-thiatriazole which has an unactivated decomposition temperature of about 115° C.

EXAMPLE 17

A ground coat formulation was made up identical to formulation D above save that, before adding the p,p'oxybis(benzenesulphonylhydrazide), the viscosity was adjusted, by addition of a carboxyl methyl cellulose, to give a viscosity of 1.96 poise at 20° C. (as measured on a Brookfield cone and plate viscometer at 20 rpm using a No. 5 spindle).

The ground coat, and plastisol (A) were printed on to a wallpaper base paper of substance 94 g/m² using a two station rotary screen printing machine operating at 15.25 meters/minute. The ground coat formulation was applied over all the paper surface using a 40 mesh screen to give a coating weight of 18 g/m², and was dried at 135° C. between the coating stations. The amount of blowing agent applied was thus 2.7 g/m².

The plastisol (A) was applied as a printed pattern, and dried at 150° C. The plastisol (A) was applied at a thickness corresponding to a weight of 80 to 100 g/m² of plastisol in the printed areas, i.e. a binder material application rate of 68 to 84 g/m².

The coated wallpaper was then passed at a line speed of 15.25 meters/minute through an oven at 200° C. to effect foaming. The residence time in the oven was 65 sec.

The resulting product had an attractive relief appearance of a pattern of foamed areas standing out from an essentially unfoamed matt background. Superimposed on the foamed areas was a blistered texture.

EXAMPLE 18

By way of comparison, Example 17 was repeated omitting the ground coat. The product had a relief pattern of foamed areas corresponding to the printed plastisol design.

EXAMPLE 19

Example 17 was repeated except that the ground coat was applied as the printed pattern while the plastisol was applied as an overall coat. The ground coat was applied at a rate of 14 g/m² (2.1 g/m² of blowing agent) while the plastisol at 150-170 g/m² (126-144 g/m² of binder material). The product had an attractive relief finish to its overall foamed surface. The printed pattern stood out in blistered relief in contrast to the areas to which no ground coat had been applied.

EXAMPLE 20

Example 19 was repeated with the ground coat being applied in an array of dots using a 25 mesh screen all over the substrate paper. The product had a foamed surface bearing a fine texture relief in the form of blisters conforming to the dot array.

This was repeated using different dot sizes and spacing and it was found that the dot array was reproduced in the foam surface if the dots were less than 2 mm in diameter and spaced at least 1 mm apart.

With larger dots and/or closer dot spacing the dot array was masked by a random blister relief texture.

EXAMPLE 21

A wallpaper base paper of substance 90 g/m$^2$ was gravure printed giving a fine texture design with a lacquer of composition:

|  | Parts |
| --- | --- |
| Nitrocellulose | 100 |
| Alkyd resin | 25 |
| Dibutyl phthalate | 25 |
| p,p'oxybis(benzenesulphonylhydrazide) | 250 |
| Ethanol | 250 |
| Ethyl acetate | 100 |

The rate of application was such that the printed areas contained 4 g/m$^2$ of blowing agent.

The printed paper was then overall coated, after allowing the lacquer to dry, with a plastisol similar to plastisol (A) save that the cadmium/zinc octoate activator was omitted.

The plastisol was applied at a binder material application rate of 129 g/m$^2$.

The coated substrate was then heated to 200° C. for 10 secs. to gell, but not foam, the plastisol.

A design was then gravure printed on the gelled plastisol surface using an activator containing ink of the following composition:

|  | Parts |
| --- | --- |
| Polyvinyl chloride | 100 |
| Pigment | 50 |
| 2-nitropropane | 222 |
| Methyl ethyl ketone | 44 |
| Toluene | 133 |
| Zinc octoate | 100 |

The ink was applied at a rate of 5 g/m$^2$.

The printed product was then heated in an oven at 200° C. for 60 seconds to effect foaming.

The pattern printed with the activator containing ink stood out in a foamed relief from the background and a different texture corresponding to the gravure printed lacquer design was superimposed over the whole wallpaper.

EXAMPLE 22

Example 21 was repeated but with the addition of 0.25 parts of zinc octoate to the plastisol. The relief contrast between the areas that had been printed with the activator containing ink and the remaining areas was not so great as in Example 21 but the background texture was more prominent than in Example 21.

EXAMPLE 23

A printing ink was made up to the following formulation:

|  | Parts |
| --- | --- |
| Styrene/acrylic polymer emulsion (50% solids) | 8 |
| Aqueous polyvinyl alcohol solution (12½%) | 8 |
| C.I. Pigment Violet 2 | 5 |
| Water | 97 |
| p,p'-oxybis(benzenesulphonylhydrazide) | 12 |
| Carboxy methyl cellulose | 1 |
| The pigment (C.I. Pigment Violet 2) is soluble in dicaprylphthalate. | |

A wallpaper base paper of substance 90 g/m$^2$ was screen printed with the above ink to a floral design. The weight of blowing agent applied was 3 g/m$^2$ to the printed areas.

The printed paper was dried and was then given an overall coating of plastisol (A) at a thickness 0.25 mm (corresponding to a polymer weight of 162 g/m$^2$) and then foamed by heating in an oven for 60 secs. at 200° C.

The resultant product displayed the floral design in a blister texture which was pale pink in colour on a non textured, white, background.

EXAMPLE 24

A PVC plastisol was made up to the following formulation:

|  | Parts | |
| --- | --- | --- |
| Paste grade vinyl chloride homopolymer | 100 | |
| Dicaprylphthalate (plasticiser) | 55.5 | Binder material |
| Epoxidised oil (stabiliser) | 3 | |
| Viscosity depressant | 3 | |
| Titanium dioxide | 21 | |
| Cadmium/zinc octoate (activator) | 4 | |
| Azodicarbonamide (blowing agent) | 5.5 | |
| Precipitated calcium carbonate (filler) | 3.8 | |

The plastisol was coated as a film of wet thickness 0.88 mm as a sacrificial coating on to a wallpaper base paper of substance 90 g/m$^2$ (FIG. 1A). The amount of blowing agent applied was thus 2.5 g/m$^2$. The coated paper was then heated in an oven at 200° C. for 60 seconds to cause the plastisol to gell and foam (FIG. 1B). The paper bearing the foam was then coated with the surface coating by application of a layer of the same plastisol (wet thickness 0.4 mm) (FIG. 1C). The amount of binder material applied from the surface coating was thus 291 g/m$^2$. The coated paper was then heated at 200° C. for 60 seconds to effect gellation and foaming and sacrifice of the sacrificial coating.

The resultant product (FIG. 1D) had a foam coating on the wallpaper base. The foam surface had an attractive relief texture having a "blistered" appearance.

Similar results were obtained when the above procedure was repeated using plastisols in which the amount of precipitated calcium carbonate was increased to 9.6 and to 25 parts.

Likewise a similar product was obtained when the precipitated calcium carbonate was omitted or replaced by 3.8 parts of a fine silica.

EXAMPLE 25

Example 24 was repeated but omitting the titanium dioxide and using 12, 15 or 24 parts of the precipitated calcium carbonate in the plastisol composition. Again an attractive blister relief was obtained, the coarseness of the relief increasing with the amount of calcium carbonate employed.

We claim:

1. A foam plastics sheet material having a decorative relief finish, comprising a substrate web with a coating containing foam-defining voids characterized in that some at least of said coating is blistered with irregular macroscopic voids greater in size than the foam-defining voids between the coating and substrate and a sacrificed foam unites the coating and substrate web.

2. A method of making a foam plastics sheet material as claimed in claim 1 comprising the steps of:
   (a) Applying a first thermally foamable coating to the substrate web;
   (b) Applying a second thermally foamable coating to the first coating; and
   (c) Thermally foaming the second coating whilst thermally sacrificing the first coating whereby irregular macroscopic voids are created below the surface of the second coating, and whereby the second coating is united with said web at the perimeters of said voids.

3. The method of claim 2 in which the first coating is foamed prior to applying the second coating and is sacrificed as the second coating is foamed.

4. The method of claim 2 in which the first coating is selected to have a lower foaming temperature than that of the second coating, the two coatings are initially foamed at the same time, and the first coating is sacrificed as the second coating completes its foaming.

5. The method of claim 2 in which the substrate web is given a ground coating of material containing a polymeric binder prior to the application of said first thermally foamable coating.

6. The method of claim 4 in which the first coating contains 0.5 to 10 g/m$^2$ of blowing agent that decomposes at a temperature at least 10° C. below the decomposition temperature of the blowing agent in the second coating.

7. The method of claim 4 in which the second coating includes a binder material and contains 1 to 10% by weight of blowing agent based on the weight of binder material.

8. A foam plastics sheet material comprising a paper substrate web, a collapsed foam coating on the web and a blistered foam coating on said collapsed coating, said blistered coating being integral with the collapsed coating at the perimeter of the blisters, the blisters being predominantly in the size range of 0.5 to 2 mm and the foam cells in the blistered foam coating being predominantly in the size range of 0.1 to 0.2 mm.

* * * * *